Figure 1:
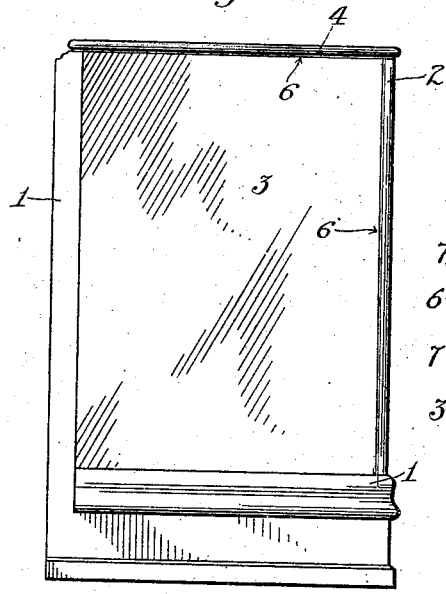

No. 845,651. PATENTED FEB. 26, 1907.
M. E. LA BERGE.
SEMI-KNOCKDOWN ALL GLASS SHOW CASE.
APPLICATION FILED APR. 12, 1906.

Witnesses:—
Frank E. Abraham.
H. W. Mansfield

Inventor,
Maximilian E. La Berge.
By Townsend, Lyon, Hackley & Knight
Attorneys

THE NORRIS PETERS CO., WASHINGTON, D. C.

UNITED STATES PATENT OFFICE.

MAXIMILIAN E. LA BERGE, OF LOS ANGELES, CALIFORNIA.

SEMI-KNOCKDOWN ALL-GLASS SHOW-CASE.

No. 845,651.　　　Specification of Letters Patent.　　　Patented Feb. 26, 1907.

Application filed April 12, 1906. Serial No. 311,294.

*To all whom it may concern:*

Be it known that I, MAXIMILIAN E. LA BERGE, a citizen of the United States, residing at Los Angeles, in the county of Los Angeles and State of California, have invented a new and useful Semi-Knockdown All-Glass Show-Case, of which the following is a specification.

The invention relates to "all-glass" showcases wherein the glass plates are fastened together by means substantially concealed within the joints between the plates; and the main object of the invention is to provide fastening means of this character which will enable the glass plates to be taken apart and put together without destruction or removal therefrom of the fastening means, the fastening being, however, such that a portion of the joint has to be cut or ripped open to detach the members, the break or joint being repaired or re-formed when the parts are again assembled together. This construction of case is herein termed a "semi-knockdown case," the joint not being freely severable, as in a full knockdown case, but being susceptible of splitting apart and re-forming.

The invention is applied in connection with a cemented structure, the glass plates being fastened together by binder-strips cemented thereto and therebetween. Said binder-strips comprise two cushioning-strips cemented to the respective plates and a divider between the strips to facilitate severance thereof.

Another important object of the invention is to improve the joint between the plates in such cemented show-cases so that it will permanently retain its adherence to the glass and its flexibility, allowing a certain amount of relative movement of the glass plates and cushioning the same so as to avoid breakage of the plates by strains or jar.

In this connection the invention comprises the application of a fastening-strip cemented to the glass plates, said strip consisting of a material which does not absorb the cement and is of a tough permanent flexible nature, its non-absorbitive quality enabling it to retain its toughness and flexibility indefinitely. In cases where felt and similar absorbent materials are used for the strip the cement enters the same, so as to impair the flexibility thereof, and as the brittleness of the cement increases with age it results eventually that the joint loses all flexibility and its effectiveness as a cushion for the glass is nullified. Even if such a strip does not become completely filled with cement the fact that it is porous or absorbent causes it eventually to become deteriorated by action of the air and water used in washing of the case, so that in practice it is found that after a time the joints made thereby are deficient either in holding power or in cushioning power.

The accompanying drawings illustrate the invention.

Figure 2:
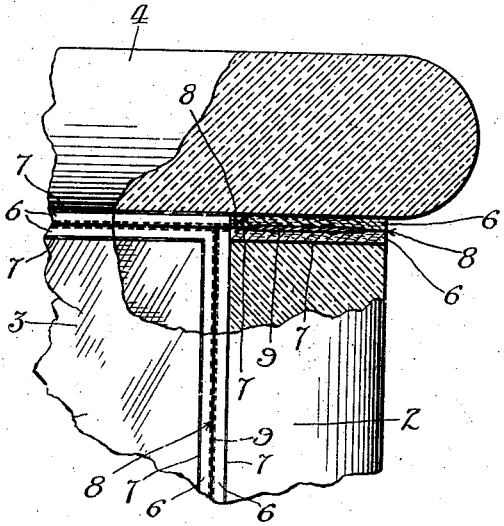
Figure 4:
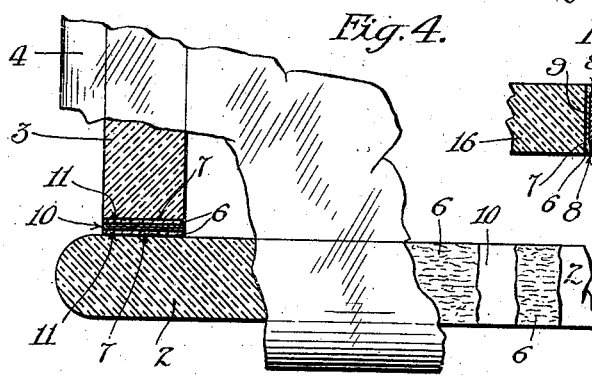
Figure 3:
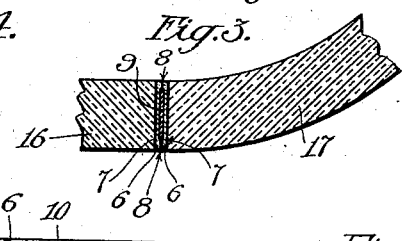
Figure 5:
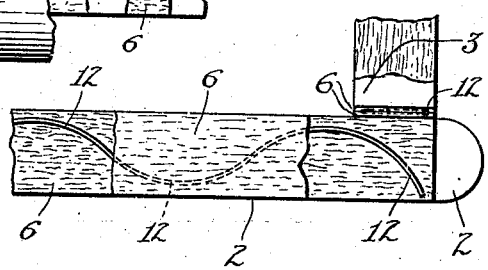
Figure 6:
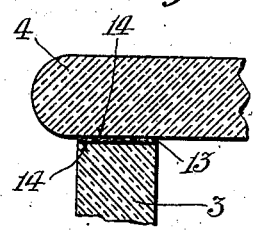

Figure 1 is an end elevation of the showcase comprising my invention. Fig. 2 is an enlarged fragmental partly-sectional end view of an upper front corner of the case. Fig. 3 is a sectional view of a butt-joint combination. Fig. 4 is a partly-sectional fragmental plan of an upper front corner of the case, showing a different form of the fastening devices. Fig. 5 is a fragmental horizontal section of an upper front corner of the case, showing another form of the invention. Fig. 6 is a fragmental vertical section showing a different form of the joint.

Referring to Fig. 1, 1 designates the frame of a show-case; 2, the front plate; 3, the end plates, and 4 the top plate thereof. The front and end plates are supposed to be supported by the base and rear frame in the usual manner, and the front, end, and top plates are connected by means of cushion fastening-strips, (indicated at 6.) These fastening-strips consist of flexible non-absorbent cushioning material—for example, rubber, cork, or leather. The preferred construction (shown in Fig. 2) comprises two strips 6 of such material cemented to the respective glass plates at each side of the joint, the cement between the respective strips and the glass being indicated at 7 and the respective strips being cemented together at their joint by cement, (indicated at 8.) To hold the strips against lateral displacement and to facilitate the separation or splitting apart of the strips in dismantling the case a divider (indicated at 9) is used, consisting, preferably, of a strip of metal, fiber, or other flexible material harder than the cushion-strips extending between the two fastening-strips 6, and in order to further facilitate the separation of the strips this metal strip may be oiled preliminary to be put in place, so that the cement will not stick thereto.

The case as so constructed is built up as follows: The glass plates are each provided with the non-absorbent flexible fastening-strips 6 cemented thereto and shipped in that condition. In building up the case cement is applied to the outer faces of these strips, and the metal dividing-strip 9, preferably oiled, is placed in position between the strips, and the plates are then brought together and held in the usual manner by temporary clamps until the cement is set. The case will generally be set up in this manner for shipping, and then before shipping the parts are disassembled by inserting a knife or cutter at the cemented joints 8, between the respective pairs of strips and slitting the strips apart, the knife being inserted sufficiently far so that it will run on the metal dividing-strip 9, the latter acting as a guide for the knife in stripping the parts. The parts may then be packed and shipped and on reaching their destination may be assembled by repetition of the above-described operation, it being only necessary to apply an additional coat of cement to the outer faces of the strips and bring the parts together, as above set forth.

In case it is desired to have the metal separator-strip adhere to one of the binding or fastening strips 6 the corresponding side of said separating-strip may be left unoiled, so that the cement will adhere thereto, or the oil may be applied to the central portion or zone of one of the fastening-strips 6 instead of to the metal strip. The strip 9 is not necessarily metal, as it may be of other material not readily susceptible by the stripping-tool—for example, hard fiber. The same construction is applicable to a butt-joint, as shown in Fig. 3, where two glass plates 16 17 are connected by strips 6, cemented thereto and to one another, or with an interposed dividing-strip 9. One or more of these plates may be curved, as shown.

In case the dividing-strip is made of material, such as hard fiber, which can be cut under certain conditions by the slitting-knife the construction shown in Fig. 4 may be adopted, the said strip (indicated at 10) being folded on itself to form two layers which are fastened by cement (indicated at 11) to the respective fastening-strips 6 of leather, rubber, cork, or other non-absorbent flexible material. The inner contacting faces of the two fiber layers formed by the folded strip are left uncemented, the fold or bend of the fiber strip forming the joint or connection between the two sides, and on inserting the knife at the end of the joint it can be run along this bend, slitting the same and enabling the case to be taken to pieces. If it is desired to again reassemble the parts with the same fastening devices, the opposed faces of these fiber-strip layers may then be coated with cement to enable the parts to adhere.

The strip for dividing or separating the fastening devices may occupy an extremely small part of the width of the strip. For example, it may be in the form of a wire, (indicated at 12 in Fig. 5,) and said wire may be coated with cement, the balance of the outer or joining faces of the non-absorbent fastening-strips 6 being in that case left uncoated with cement, so that when the wire is placed therebetween and the parts pressed together the cement on the wire will squeeze into the joint between the strips 6 to a sufficient extent to bind the parts together, and if by means of a suitable tool the end of this wire is grasped the wire can be pulled out from between the non-absorbent fastening-strip 6, leaving the latter entirely free and separate. In this construction renewal of the joint may be made as often as desired by applying a newly-cemented wire. The wire is preferably bent in sinuous form to more completely cover the joint and give a better adhesion. In this case, as in the form shown in Fig. 2, the metallic dividing means 9 or 12 is made sufficiently thin so that it can fully embed itself in cushioning-strips 6, and therefore does not add to the thickness of the joint. When using leather or rubber for these cushioning-strips, they can be made so thin that the double layer thereof is as small or smaller in thickness than the ordinary felt layer, and in the form shown in Fig. 3 the fiber can be made of such thinness that the thickness is not perceptibly increased.

One feature of the invention—i. e., the use of a non-absorbent cushioning and binding strip in connection with a cemented show-case—is of broader application in the partial knockdown principle above described. For example, as shown in Fig. 6, a strip 13 is indicated fastened by cement 14 to the respective plates 4 and 3, the said strip being of leather, rubber, cork, or other non-absorbent tough material having the requisite quality of flexibility, cushioning capacity, and strength. With such a strip the joint can be made thinner than with felt.

What I claim is—

1. A show-case comprising a plurality of glass plates, each provided with cushion-strips of non-absorbent material cemented thereto, the cushion-strips of adjacent glass plates being cemented together, and dividing means extending in the joint between the respective cushion-strips, said dividing means being flexible and of harder material than the cushion-strips.

2. A show-case comprising a plurality of glass plates, each provided with a cushion-strip cemented thereto, the cushion-strips of adjacent plates opposing one another, and an intermediate removable strip between the said cushion-strips of adjacent plates.

In testimony whereof I have hereunto set my hand, at Los Angeles, California, this 5th day of April, 1906.

MAXIMILIAN E. LA BERGE.

In presence of—
ARTHUR P. KNIGHT,
VERNA A. TALBERT.